(12) United States Patent
Rausch (10) Patent No.: US 7,575,213 B2
(45) Date of Patent: Aug. 18, 2009

(54) ARTICLE AND METHOD FOR HANGING ITEMS FROM I-JOIST BEAMS

(76) Inventor: Matthew S. Rausch, 1001 Turman Dr., Fort Collins, CO (US) 80525

( * ) Notice: Subject to any disclaimer, the term of this patent is extended or adjusted under 35 U.S.C. 154(b) by 184 days.

(21) Appl. No.: 11/305,363

(22) Filed: Dec. 16, 2005

(65) Prior Publication Data

US 2007/0145222 A1    Jun. 28, 2007

(51) Int. Cl.
*A47H 1/10* (2006.01)
(52) U.S. Cl. ...................................... 248/317; 248/339
(58) Field of Classification Search ................. 248/317, 248/343, 339, 300, 301, 342, 906; 52/506.06, 52/39, 702, 712
See application file for complete search history.

(56) References Cited

U.S. PATENT DOCUMENTS

| 344,691 A | 6/1886 | Thomas |
| 3,279,300 A | 10/1966 | Larson |
| 3,458,166 A * | 7/1969 | Lanz ........................ 248/218.2 |
| 3,749,341 A | 7/1973 | Swessle, Jr. |
| 3,837,609 A * | 9/1974 | Weiss et al. ................. 248/317 |
| D257,947 S | 1/1981 | Reynoso |
| 4,706,922 A | 11/1987 | Grow |
| 4,995,206 A * | 2/1991 | Colonias et al. ............... 522/97 |
| 5,456,441 A * | 10/1995 | Callies ........................ 248/521 |
| 5,636,819 A | 6/1997 | Kettlestrings |
| 5,740,994 A * | 4/1998 | Laughlin .................... 248/68.1 |
| 5,768,843 A * | 6/1998 | Dziedzic .................. 52/506.06 |
| 5,908,119 A * | 6/1999 | Kump et al. ................. 211/113 |
| 6,202,969 B1 | 3/2001 | Orr |
| 6,334,285 B1 | 1/2002 | Kirschner |
| D462,892 S | 9/2002 | Snyder |
| 6,481,676 B1 | 11/2002 | Bluestone |
| 6,595,471 B1 | 7/2003 | Botting |
| 6,607,086 B1 | 8/2003 | Gretz |
| 6,612,529 B2 | 9/2003 | Snyder |
| 6,967,284 B1 * | 11/2005 | Gretz .......................... 174/58 |

FOREIGN PATENT DOCUMENTS

GB          2255990 A    * 11/1992

* cited by examiner

*Primary Examiner*—Ramon O Ramirez
(74) *Attorney, Agent, or Firm*—Paul M. Thompson; Cochran Freund & Young LLC (57) ABSTRACT

Disclosed are a method and device for a hanging device that is used to support ductwork, pipes, wiring, conduit and the like from support beams such as I-Joists. The disclosed embodiments take advantage of I-joist geometry and utilize the flanges of the joist to provide a quick and reliable means for securing ductwork and other elongated objects in construction projects.

26 Claims, 10 Drawing Sheets

ARTICLE AND METHOD FOR HANGING ITEMS FROM I-JOIST BEAMS

BACKGROUND OF THE INVENTION

With the increasing demands on time and ease of construction, conventional metal strap material used to support duct work and other elongated construction objects from support beams is cumbersome and time intensive. Because labor costs for time spent cutting forming and attaching strapping or other conventional duct hangers far exceeds the cost of the hangers themselves, a need exists for an apparatus that can reduce installation time and effort of the installer, while minimizing or eliminating the need for tools and additional fasteners to attach hangers to the support beams and/or ductwork.

SUMMARY OF THE INVENTION

An embodiment of the present invention may therefore comprise an apparatus for supporting an elongated object from an I-joist beam comprising: a shaft having a central portion separating a first end and a second end; a joist connector connected to the first end of the shaft, the connector engaging and confining a joist flange of an I-joist, thereby creating a connection therebetween; and, a support connected to the second end of the shaft from which the elongated object is supported.

An embodiment of the present invention may further comprise a method of supporting an elongated object from an I-joist beam comprising the steps of: connecting a joist connector to a joist flange of an I-joist by confining at least a portion of the joist flange within a portion of the joist connector; and, supporting the elongated object from a shaft that is connected to the joist connector.

An embodiment of the present invention may also comprise a hanger for supporting an elongated object from an I-joist beam comprising: means for connecting a joist connector to a joist flange of an I-joist by confining at least a portion of the joist flange within a portion of the joist connector; and, means for supporting the elongated object from a shaft connected to the joist connector.

DETAILED DESCRIPTION OF THE INVENTION

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

The various embodiments disclose a hanging device that is used to support ductwork, pipes, wiring, conduit and the like from support beams. Current construction in both residential and commercial buildings typically incorporates floor and roof joists that are a prefabricated engineered wood "I-beam" design. Usually these structural, load-carrying members called I-joists are a combination of an Oriented Strand Board (OSB) material making up the center span of the beam and flanges made from wood composite or sawn lumber. This allows up to two-thirds less wood than traditional sawn-lumber joists and also resist shape-changing effects of temperature and moisture. The disclosed embodiments take advantage of this I-beam geometry and utilize the flanges of the joist to provide a quick and reliable means for securing ductwork and other elongated objects in construction projects.

Figure 1:
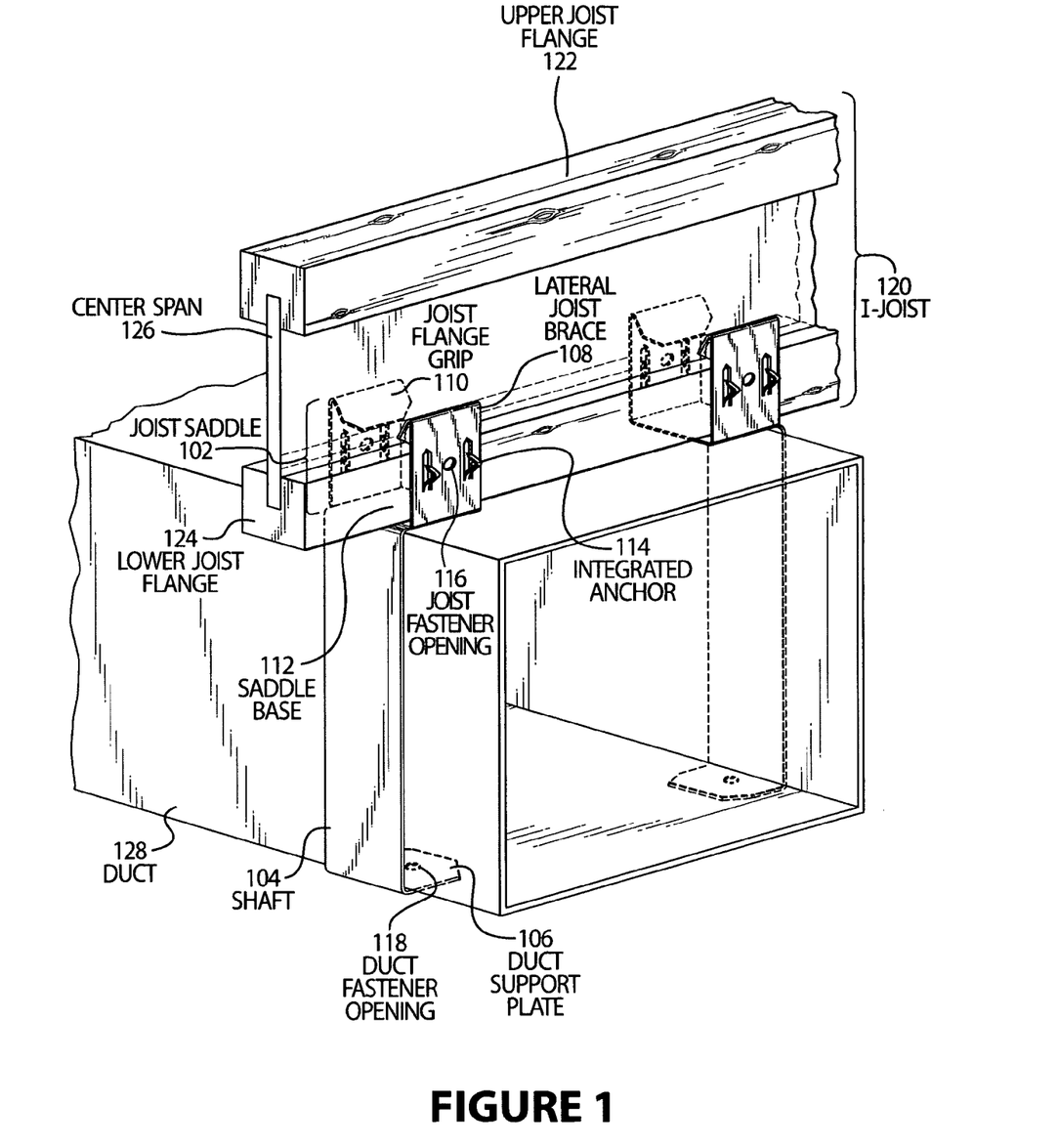
FIG. 1 illustrates an embodiment of a pair of hangers used to support ducts from an I-joist beam.

As illustrated in FIG. 1, an I-joist beam 120 that may find typical application as a floor or roof joist in a commercial or residential building is used to support ductwork [typically heating ventilation and air conditioning (HVAC)]. The I-joist 120 typically comprises an upper joist flange 122 bridged to a lower joist flange 124 by a center span 126. The geometry of the lower joist flange 124 is utilized to provide a stable attachment point for the I-joist hanger. As shown in FIG. 1, the I-joist hanger, which may typically be manufactured out of a sheet metal, comprises a joist saddle 102 that surrounds the lower joist flange 124 and spans either side of the flange with a lateral joist brace 108. The two lateral joist braces 108 are joined and held in a substantially parallel manner on the bottom by a substantially perpendicular saddle base 112 that spans the lower surface of the lower joist flange 124. The saddle base 112 and lateral joist braces 108 therefore form a "U" shaped structure that fits over the lower joist flange 124. The upper portion of each lateral joist brace 108 comprises a joist flange grip 110 which is an angularly positioned rigid structure that creates a gap less than that of the width of the joist flange.

Typically, the joist flange grip 110 is an extension of the lateral joist brace 108 that has been bent inward and downward toward the saddle base 112 with the ends of the joist flange grip 110 positioned at a height greater than the height of the lower joist flange 124 thereby forming a structure upon which the joist saddle 102 may rest by contacting the upper surface of the lower joist flange 124. The joist hanger is attached to the I-joist 120 by pressing the joist saddle 102 over the lower joist flange 124. This is done by placing the outer surface of the joist flange grip 110 in contact with the lower joist flange 124 and utilizing an upward force upon the saddle base 112 to spread the lateral joist braces 108 so that the joist flange grips 110 pass over the lateral surfaces and engage upon the upper surface of the lower joist flange 124 to capture or confine the lower joist flange 124 and form a "snap fit". This connection may therefore be performed without the aid of additional tools or fasteners, and provides a reversible attachment that may be positioned along the length of the lower joist flange 124 by sliding the hanger down the length of the I-joist.

Extending downwardly from the joist saddle 102, and connected to the saddle base 112, a shaft 104 extends the height of the duct 128 and supports the bottom of the duct 128 with a duct support plate 106. If additional securing means is necessary to hold the duct 128 in contact with the joist hanger, additional fasteners may be secured between the hanger and the duct. This may be accomplished for instance, by incorporating a duct fastener opening 118 in the duct support plate 106 (as shown in FIG. 1) or on the shaft 104 (not shown) and utilizing a standard machine screw, rivet or the like through the fastener opening and attaching to the duct 128. If additional securing means is necessary to hold the joist hanger in contact with the I-joist 120, additional fasteners may be secured between the hanger and the duct. This may be accomplished for instance, by incorporating fastening means such as integrated anchors 114 on the lateral joist braces 108. In the embodiment shown in FIG. 1, the integrated anchors 114 are typically die cut when the sheet metal is cut or bent, and form hinged "nails" that can easily be driven into the wood lower flange joist 124. Additionally as with the duct support plate 106, a joist fastener opening 116 in the lateral joist brace 108 may serve as an attachment point for a conventional nail, screw or other type of fastener and thereby attaching to the I-joist 120.

Figure 2:
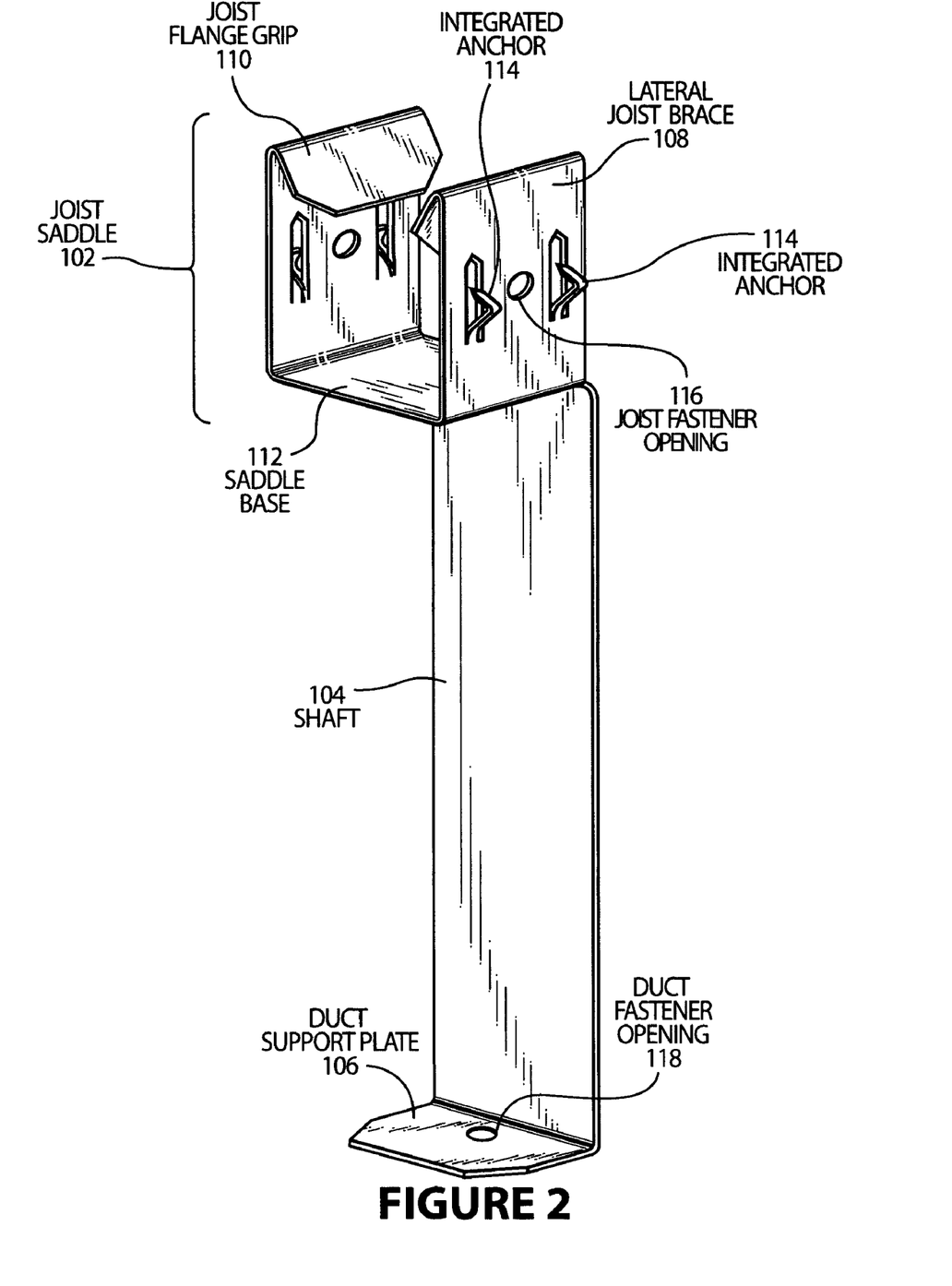
FIG. 2 illustrates an embodiment of a hanger for supporting ductwork.

FIG. 2 is an illustration detailing a joist hanger of FIG. 1. While a single piece of die cut, stamped sheet metal is one likely embodiment, the hangers may be made from a variety of materials and processes that allow the device to function in its intended purpose. For example the hanger may be injection molded with a plastic that allows flexure of the lateral joist braces 108 so as to facilitate the snap fit and retention of the joist saddle 102 onto the lower joist flange 124. Whereas most ductwork and I-joists are typically manufactured in standard sizes, the design of the embodied joist hanger allows for easy adaptation to a variety of application sizes. By extending the length of the shaft 104, and by varying the spacing pairs of hangers from an I-joist, a variety of duct sizes and shapes may be accommodated. In a similar manner, the width of the saddle base 112 as well as the length of the lateral joist brace 108 may be varied to accommodate a variety of I-joist sizes.

Figure 3:
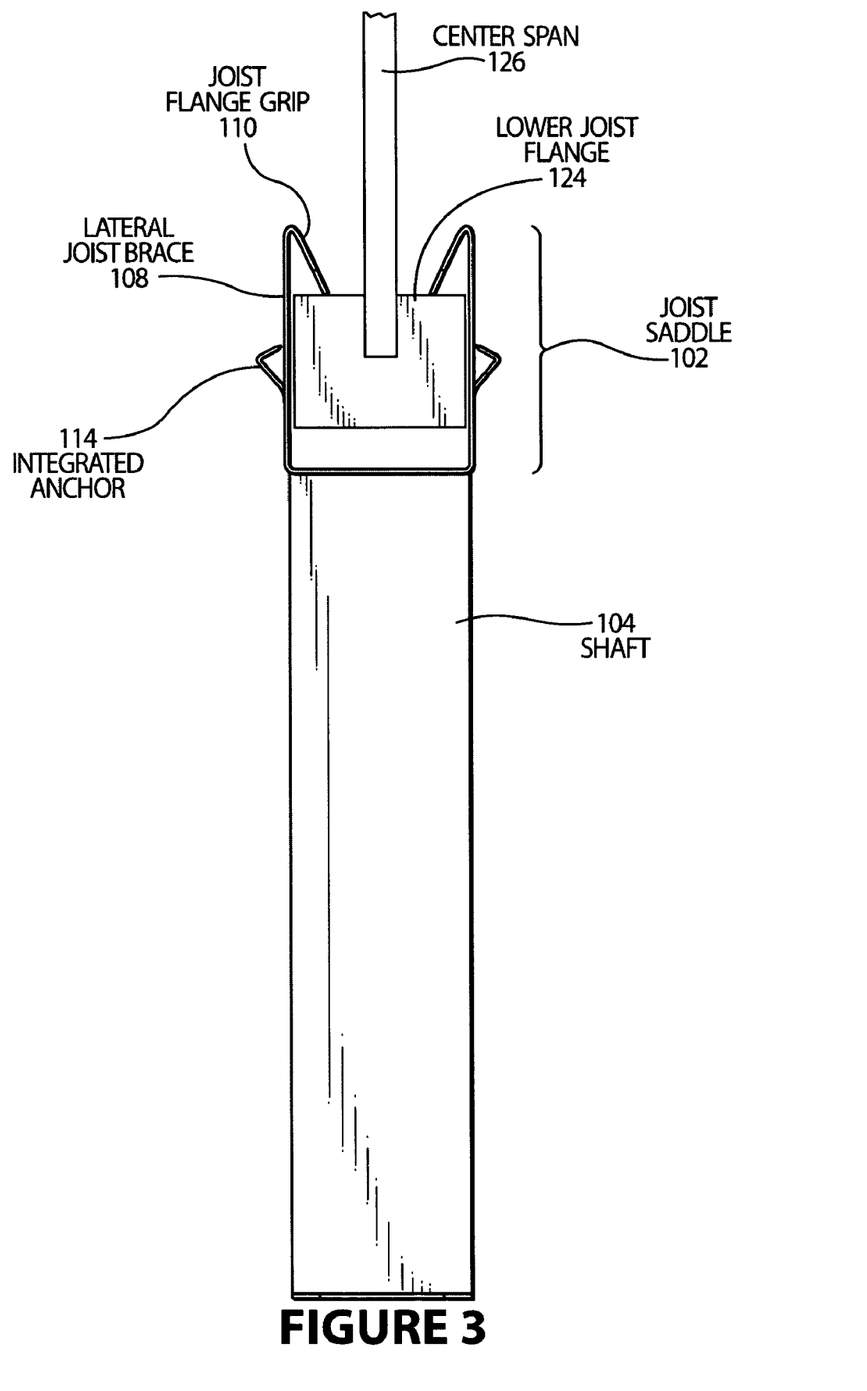
FIG. 3 illustrates an embodiment of a hanger used to support ducts from an I-joist beam.

FIG. 3 is an illustration detailing the lateral view showing the joist hanger of FIG. 1 as it is secured to an I-Joist. As can be seen in FIG. 3, the joist saddle 102 extends over the lower joist flange 124 and is retained vertically by a pair of joist frame grips 110 that rest upon the upper surface of the lower joist flange 124. As the lateral view illustrates, the angle at which the joist frame grip 110 is positioned relative to the lateral joist brace 108 is such that it allows the lower joist flange 124 to push open the span of the pair of lateral joist braces 108 with upward force on the hanger. The joist frame grips 110 may then snap into an interference position once the grips clear the lateral joist brace 108 thereby capturing the lateral joist brace 108.

Figure 4:
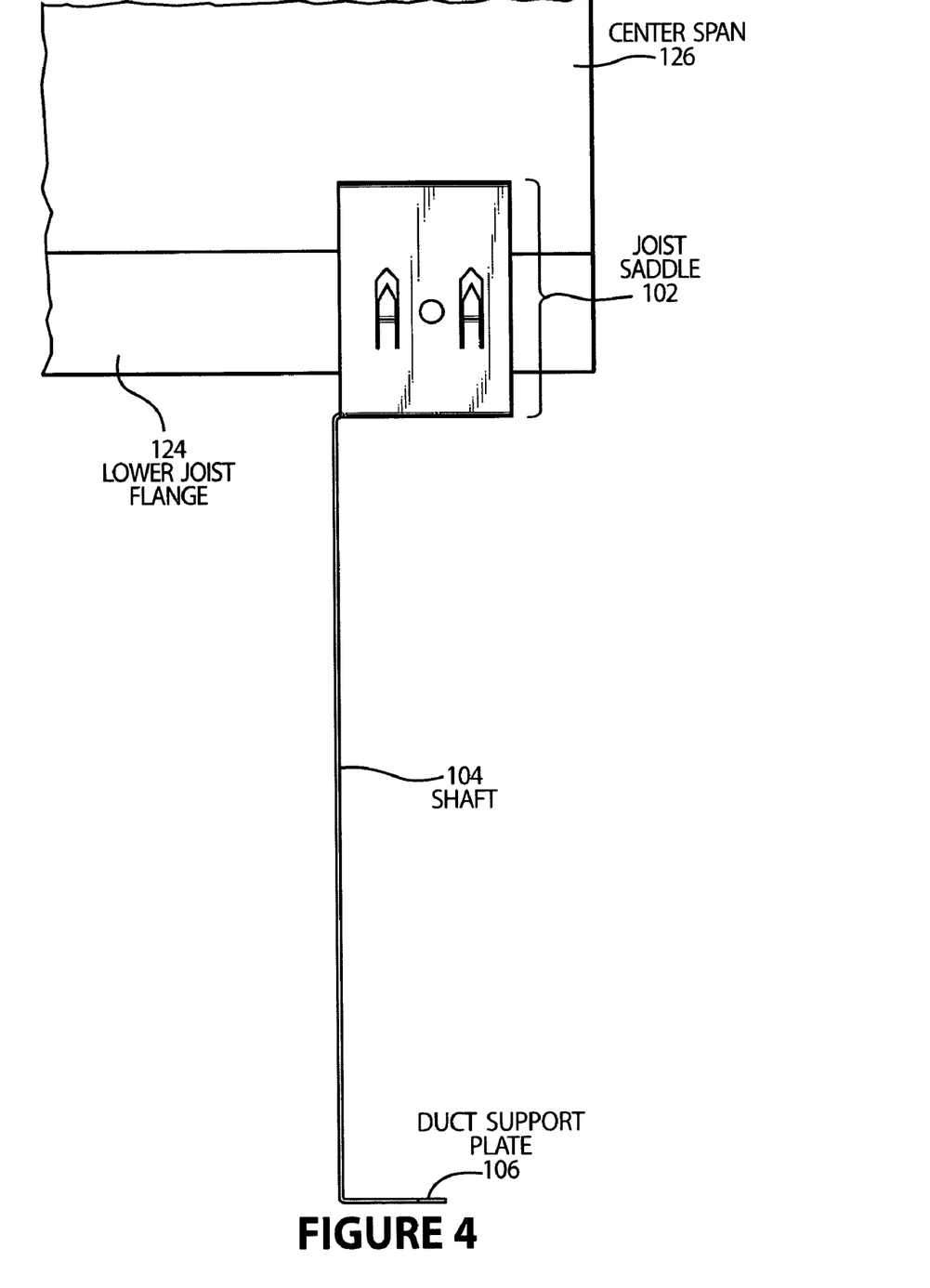
FIG. 4 illustrates an embodiment of a hanger used to support ducts from an I-joist beam.

FIG. 4 is an illustration detailing a front elevation view showing the joist hanger of FIG. 1 as it is secured to an I-Joist. As can be seen in FIG. 4, the joist saddle 102 extends over the lower joist flange 124 and is readily positionable along the span of the lower joist flange 124. This allows for easy positioning and repositioning of the I-joist hanger along the length of the I-joist.

Figure 5:
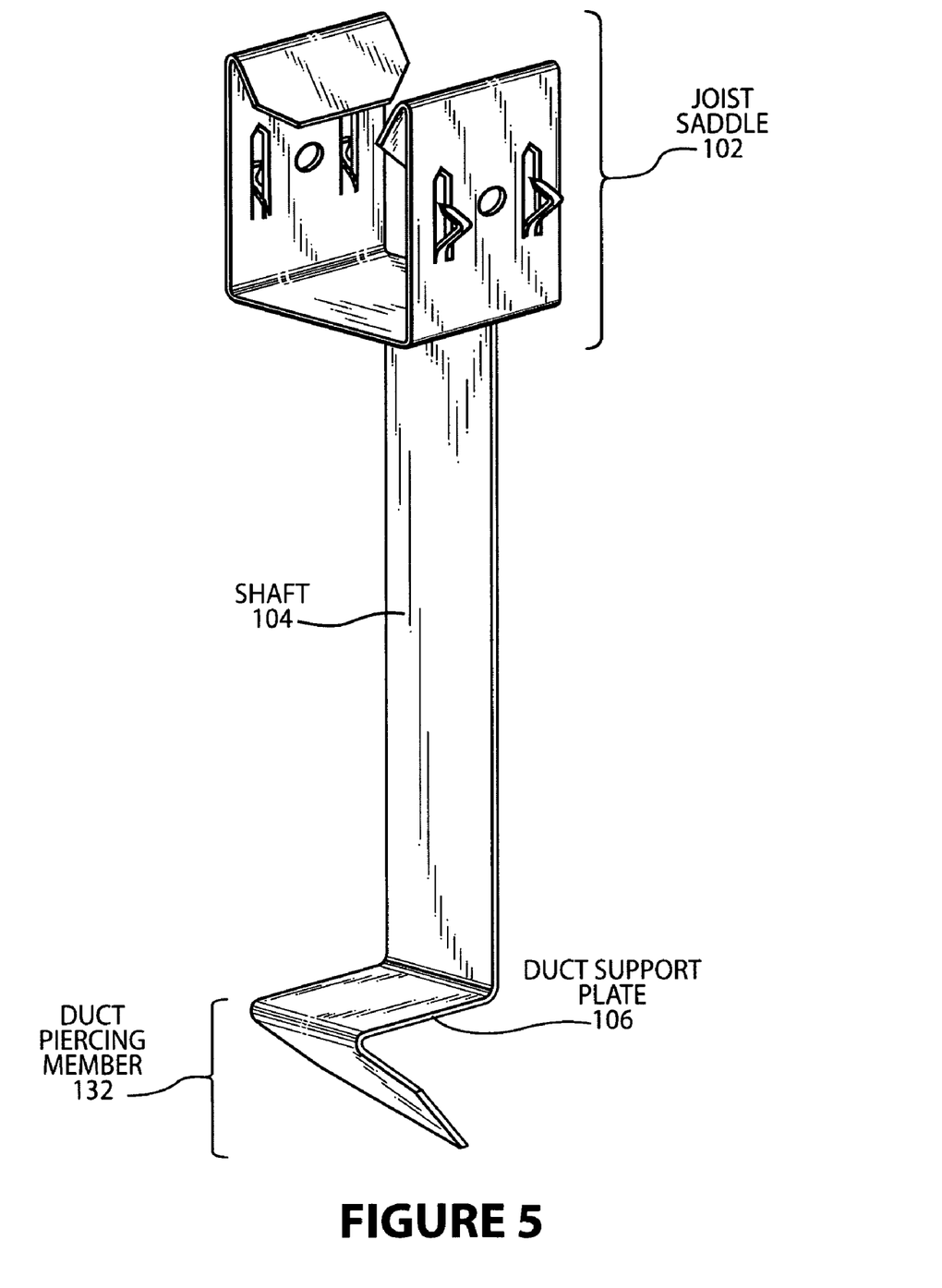
FIG. 5 illustrates another embodiment of a hanger for supporting ductwork.

FIG. 5 illustrates an additional embodiment of a hanger for supporting ductwork. The embodiment of FIG. 5 is similar to that illustrated and described in FIGS. 1-4, in that the joist saddle 102 and shaft 104 are analogous but the attachment of the hanger to the duct is performed by utilizing a duct piercing member 132 placed at the distal end of the shaft 104 to pierce the sidewall of the duct along the side of the ductwork and support the weight of the duct with a duct support member 130. In order to accommodate the sidewall attachment of the hanger, the shaft 104 would be adapted to a length shorter than the height of the duct.

Figure 6:
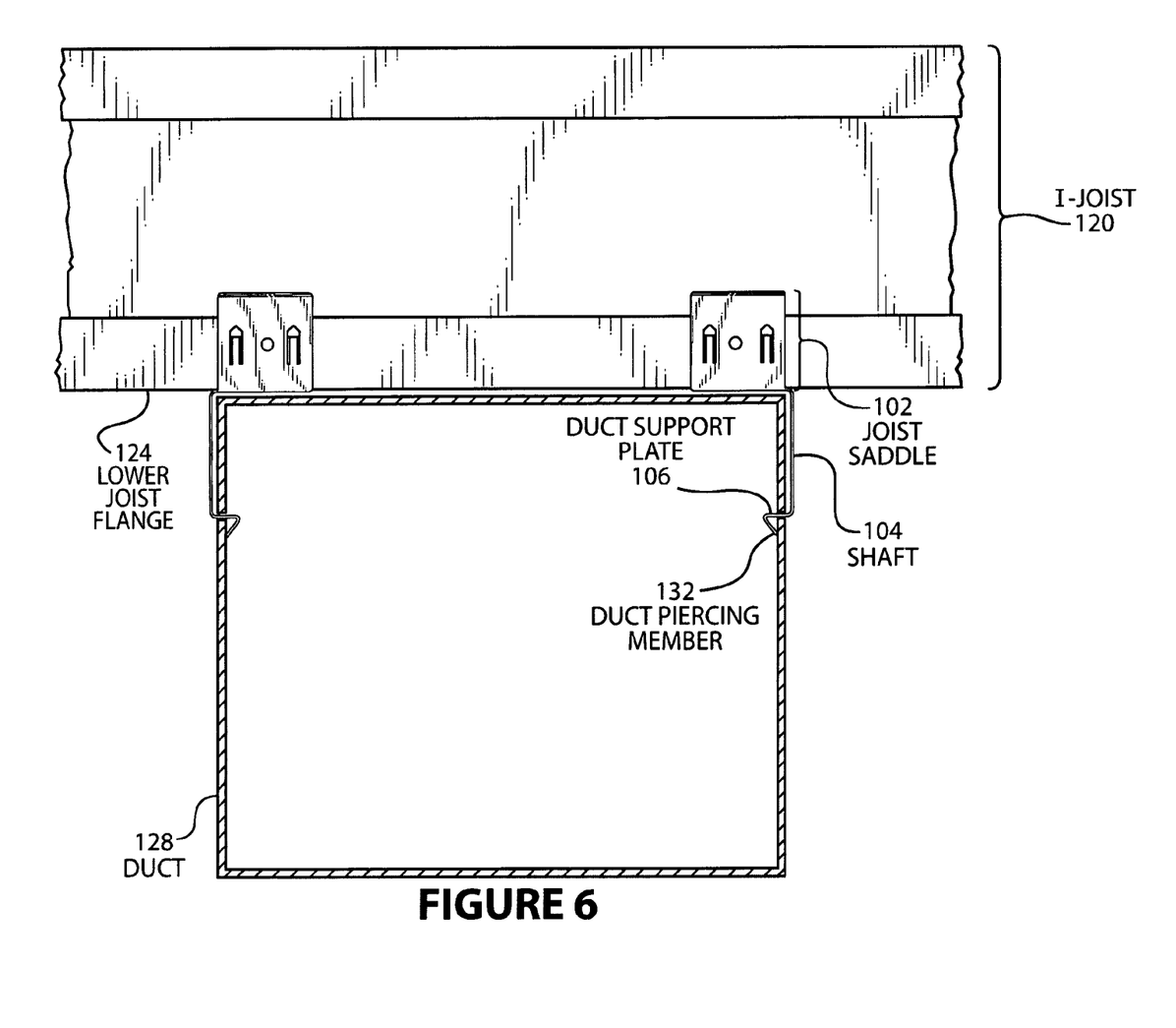
FIG. 6 illustrates another embodiment of a pair of hangers used to support ducts from an I-joist beam.

FIG. 6 is an illustration detailing a front elevation view showing the joist hanger of FIG. 5 securing a duct 128 to an I-Joist 120. As can be seen in FIG. 5, the hanger attaches to the I-joist 120 in a similar manner to the embodiment of FIG. 1 in that the joist saddle 102 attaches to the lower joist flange 124. In this embodiment, the duct piercing member is inserted into the duct 128 by placing the duct piercing member 132 approximately perpendicular to the sidewall of the duct 128 and applying a force sufficient to penetrate the sidewall with the sharp end of the duct piercing member 132. Once the piercing member 132 has penetrated the sidewall, the duct support member 130 is nearly fully inserted into the penetration to the shaft 104. The joist hanger is then rotated about the junction of the duct support member 130 and the shaft 104 within the opening of the pierced sidewall in an upward manner until the lateral duct brace is approximately parallel with the pierced sidewall of the duct 128. Once this piercing, insertion and rotation is performed on both sides of the duct 128 with a pair of joist hangers, the associated pair of joist saddles 102 are attached to the I-joist 120 along the lower joist flange 124. In this manner the duct may be hung quickly without the aid of tools and without the necessity of additional fastening devices such as nails, screws, rivets and the like.

Figure 7:
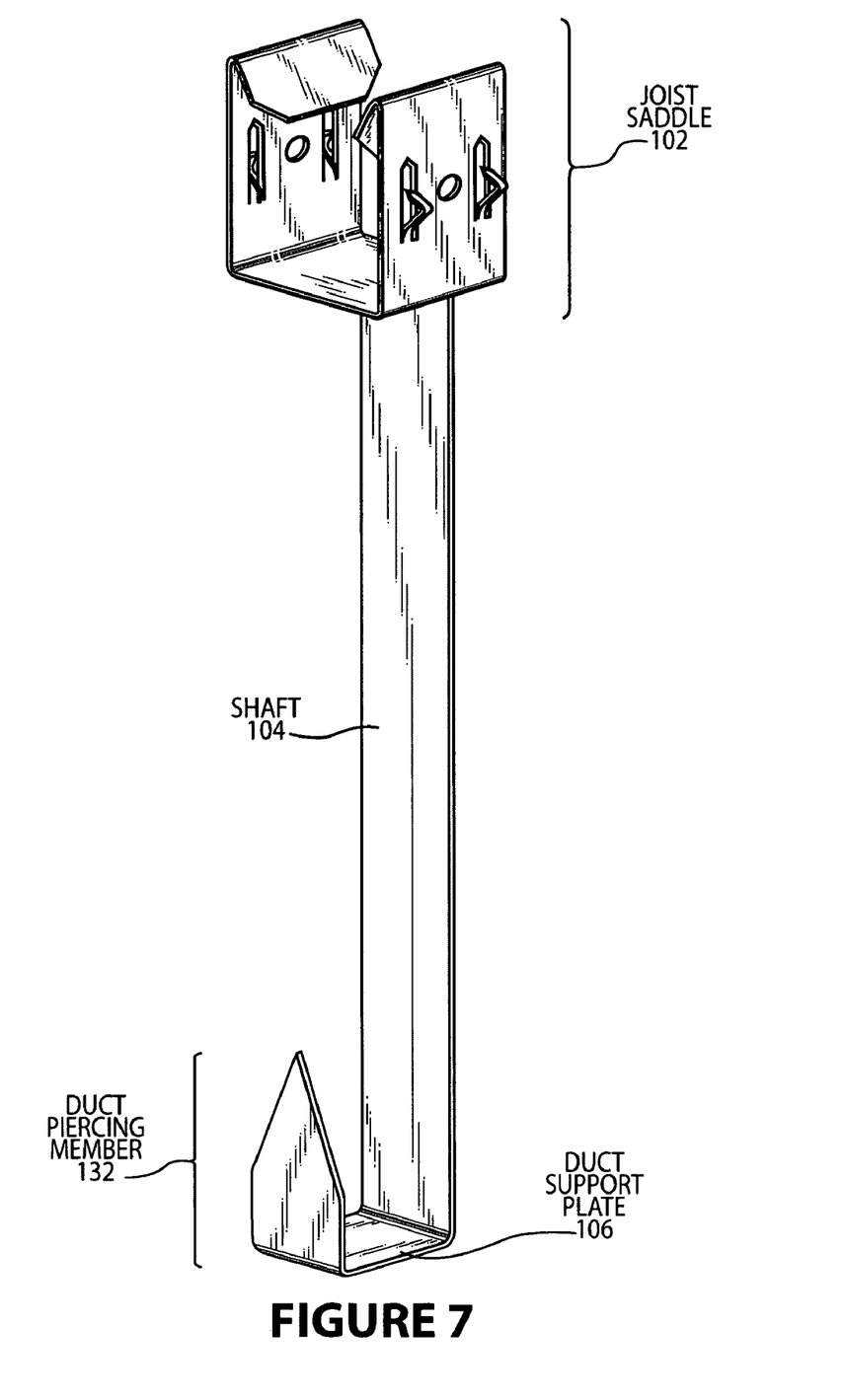
FIG. 7 illustrates an additional embodiment of a hanger for supporting ductwork.

FIG. 7 illustrates an additional embodiment of a hanger for supporting ductwork. The embodiment of FIG. 7 is similar to that illustrated and described in FIGS. 1-4, in that the joist saddle 102 and shaft 104 are analogous, but the attachment of the hanger to the duct is performed by utilizing a duct piercing member 132 to pierce the bottom wall of the duct and support the weight of the duct with a duct support member 130. In order to accommodate the bottom wall attachment of the hanger, the shaft 104 would be adapted to a length slightly longer than the height of the duct.

Figure 8:
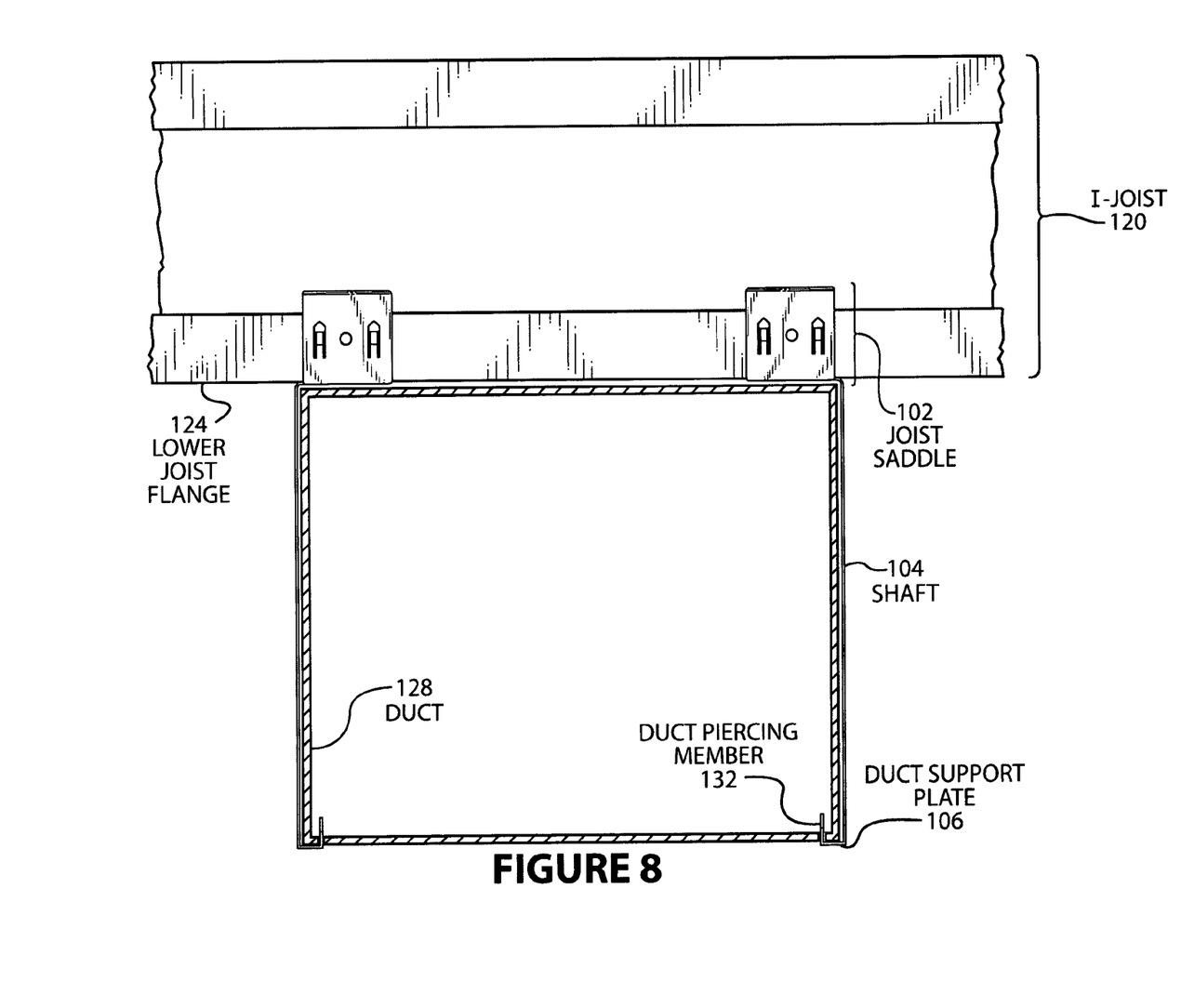
FIG. 8 illustrates an additional embodiment of a pair of hangers used to support ducts from an I-joist beam.

FIG. 8 is an illustration detailing a front elevation view showing the joist hanger of FIG. 7 securing a duct 128 to an I-Joist 120. As can be seen in FIG. 7, the hanger attaches to the I-joist 120 in a similar manner to the embodiment of FIG. 1 in that the joist saddle 102 attaches to the lower joist flange 124. In this embodiment, the duct piercing member is inserted into the duct 128 by placing the duct piercing member 132 approximately perpendicular to the bottom wall of the duct 128 and applying a force sufficient to penetrate the bottom wall with the sharp end of the duct piercing member 132. Once the piercing member 132 has penetrated the bottom wall, the duct support member 130 is placed flush with the outer bottom wall and the shaft 104 extends upward along the sidewall of the duct 128. Once this piercing and insertion is performed on both sides of the duct 128 with a pair of joist hangers, the associated pair of joist saddles 102 are attached to the I-joist 120 along the lower joist flange 124. In this manner the duct may be hung quickly without the aid of tools and without the necessity of additional fastening devices such as nails, screws rivets and the like.

Figure 9:
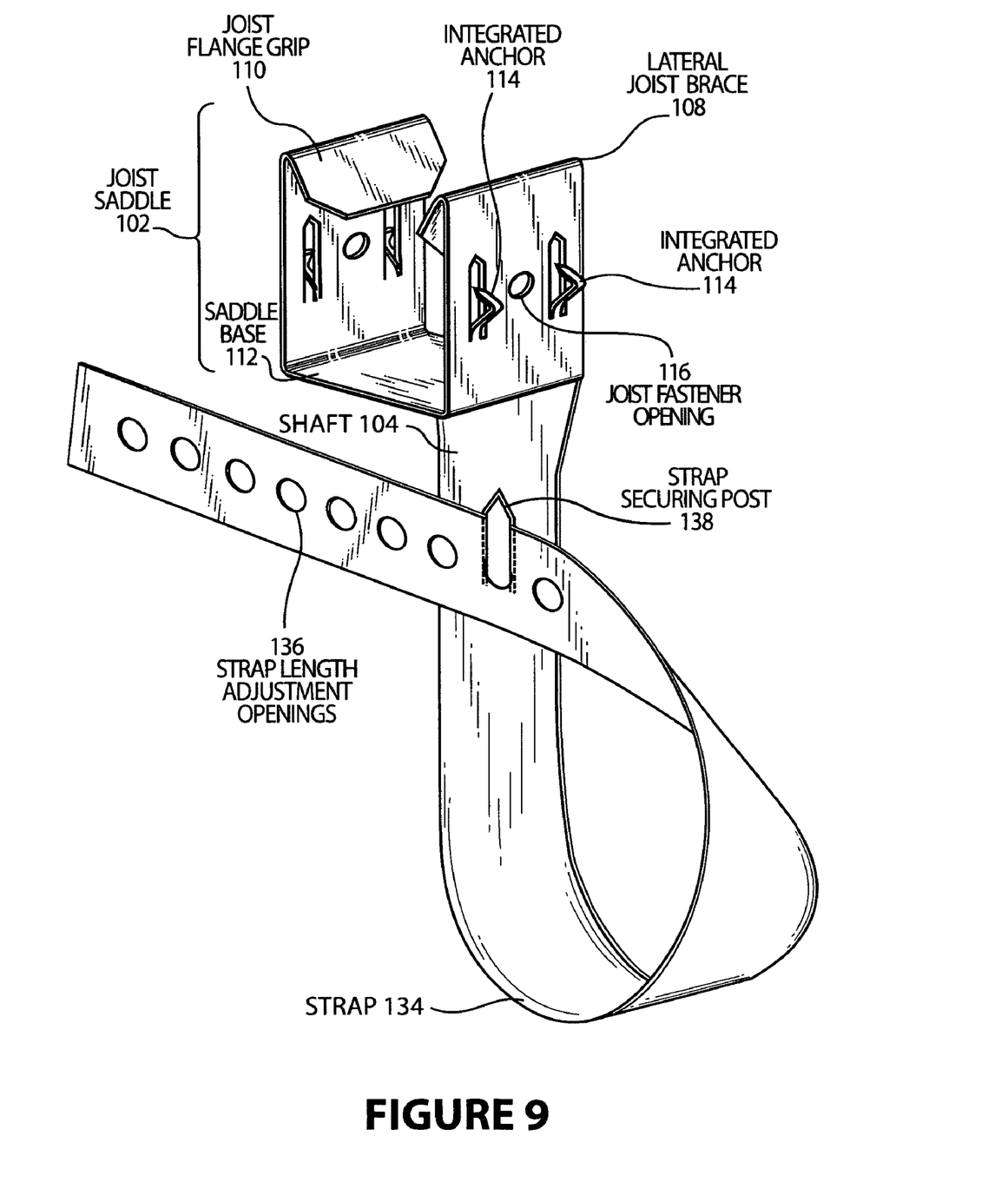
FIG. 9 illustrates an additional embodiment of a hanger for supporting elongated objects.

FIG. 9 illustrates an additional embodiment of a hanger for supporting other elongated objects such as pipes, conduit, wiring, cabling and the like. The embodiment of FIG. 9 is similar to that illustrated and described in FIGS. 1-4, in that the joist saddle 102 is analogous, but a flexible strap 134 extends from the shaft 104 and the attachment of the hanger to the hung object is performed by strapping the object with a loop formed by the strap 134. This loop may be formed for instance, by positioning the strap 134 around the object, and securing the distal end of the strap. For example, a strap length adjustment opening 136 may be formed about the length of the hanger strap and the hanger can be sized and secured to a strap securing post 138 that is formed on the proximal end of the strap 134 or on the saddle joist (not shown).

Figure 10:
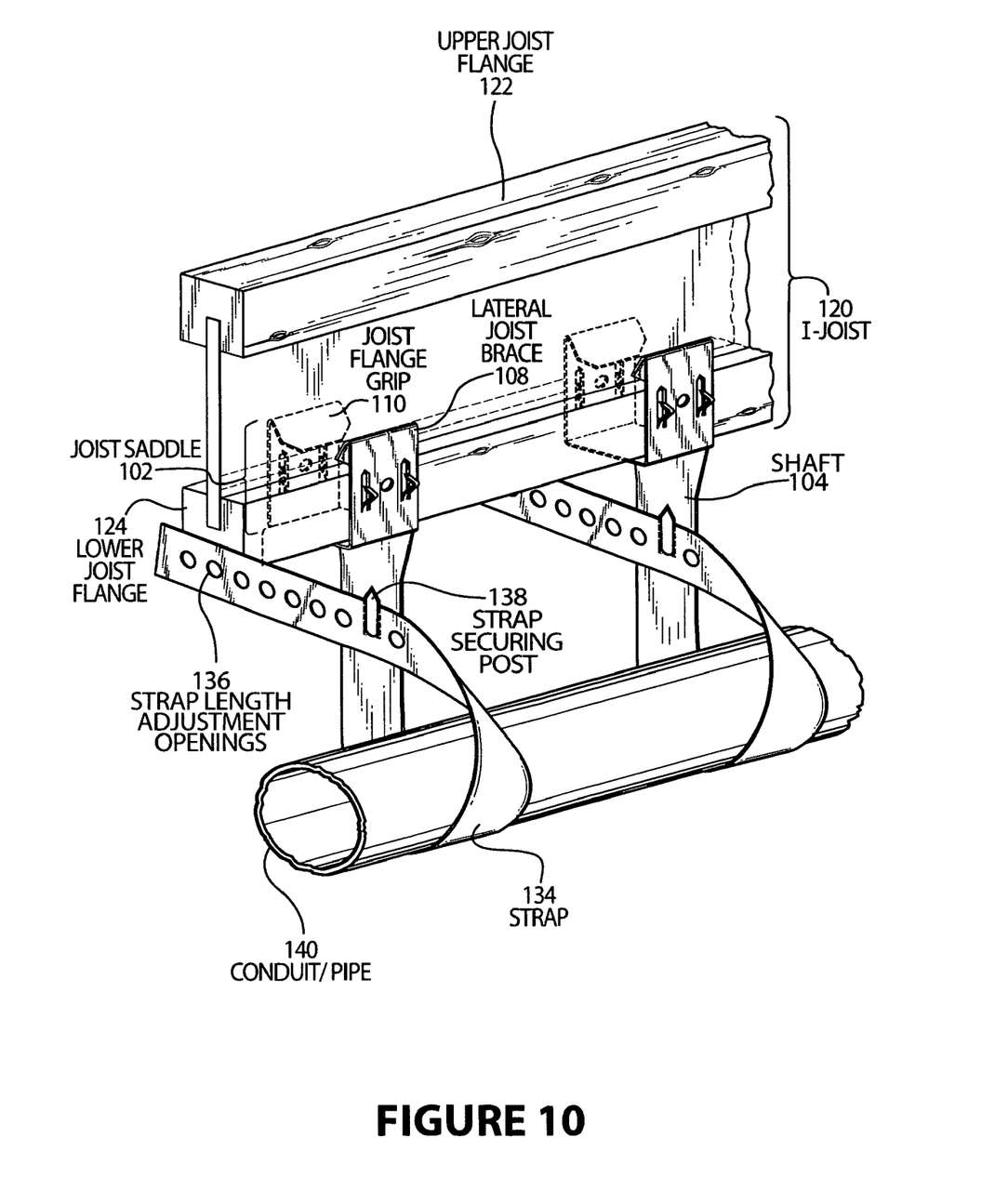
FIG. 10 illustrates an additional embodiment of a pair of hangers used to support an elongated object from an I-joist beam.

FIG. 10 is an illustration detailing a front elevation view showing the joist hanger of FIG. 9 securing a pipe/conduit 140 to an I-Joist 120. As can be seen in FIG. 9, the hanger attaches to the I-joist 120 in a similar manner to the embodiment of FIG. 1 in that the joist saddle 102 attaches to the lower joist flange 124. In this embodiment, the pipe/conduit 140 is looped within the strap 134 and the free (distal) end of the strap is secured to the shaft 104 with a securing post 138. A wide variety of pipe/conduit 140 sizes can be accommodated in this manner and since the strap 134 can be made sufficiently flexible to accommodate a quarter rotation objects may be easily hung in any direction relative to the joist length. In this manner various objects such as water, gas or refrigerant pipes, as well as wiring, cables and conduit, may be hung quickly without the aid of tools and without the necessity of additional fastening devices such as nails, screws rivets and the like.

The embodiments disclosed above, offer numerous advantages such as allowing an installer to spend less time measuring, anchoring and cutting metal strapping in order to hang ductwork. This time savings greatly reduces the installation costs and allows greater productivity for the installer.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. An apparatus for supporting an elongated object from an I-joist beam comprising:
    a single shaft having a central portion separating a first end and a second end;
    a joist connector connected to said first end of said shaft comprising:
        a base;
        at least two lateral joist braces connected to said base in an approximately perpendicular orientation to said base;
        a joist flange grip positioned on each said lateral joist brace at an opposing end of said base, said joist flange grip that is angled to extend towards said base; said connector that confines a joist flange of said I-joist, thereby creating a connection that supports said shaft; and,
    a support connected to said second end of said shaft from which said elongated object can be supported.

2. The apparatus of claim 1 wherein said joist connector is slideably connected to said joist flange such that said joist connector may slide along the length of said joist flange.

3. The apparatus of claim 1 wherein said joist connector further comprises:
    at least one integrated anchor that can be driven into said joist flange to form an attachment therewith.

4. The apparatus of claim 3 wherein said integrated anchor is formed from the wall of said lateral joist brace.

5. The apparatus of claim 1 wherein said shaft further comprises at least one fastener opening.

6. The apparatus of claim 1 wherein said elongated object is an air duct.

7. The apparatus of claim 6 wherein said support comprises a duct support plate that extends approximately perpendicular to said shaft.

8. The apparatus of claim 7 wherein said duct support plate further comprises at least one fastener opening.

9. The apparatus of claim 7 wherein said support further comprises a duct piercing member that extends perpendicular to said shaft.

10. The apparatus of claim 7 further comprising:
    a duct piercing member that is positioned distal to said duct support plate and that forms a sharp end to pierce a wall of said duct thereby forming an attachment point between said duct support plate and said duct.

11. The apparatus of claim 1 wherein said support comprises a flexible strap to loop around said elongated object and fasten upon said support.

12. The apparatus of claim 11 wherein said flexible strap further comprises;
    at least one strap length adjustment opening; and
    a strap securing post positioned proximal to said strap length adjustment opening.

13. The apparatus of claim 1 wherein said support comprises a hoop shaped support plate.

14. The apparatus of claim 1 wherein said support comprises a semicircular support plate.

15. The apparatus of claim 1 wherein said elongated object is a pipe.

16. The apparatus of claim 1 wherein said elongated object is a wiring conduit.

17. The apparatus of claim 1 wherein said elongated object is a wire.

18. The apparatus of claim 1 wherein said elongated object is a cable.

19. A method of supporting an elongated object from an I-joist beam comprising the steps of:
    connecting a joist connector to a joist flange of an I-joist by confining at least a portion of said joist flange within at least two joist flange grips, said joist flange grips positioned on lateral joist brace members that are connected in an approximately perpendicular orientation and angled to extend towards to a base portion of said joist connector; and,
    supporting said elongated object from a single shaft that is connected to said joist connector.

20. The method of claim 19 further comprising the step of:
    securing the position of said joist connector with respect to said joist flange with an integrated anchor formed from a portion of said joist connector.

21. The method of claim 19 further comprising the step of:
    securing the position of said joist connector with respect to said joist flange with a fastener secured through a portion of said joist connector.

22. The method of claim 19 wherein said step of supporting said elongated object from a single shaft that is connected to said joist connector further comprises:
    securing a portion of said shaft to said elongated object.

23. The method of claim 19 wherein said step of supporting said elongated object from a single shaft that is connected to said joist connector further comprises:

securing a portion of said shaft to said elongated object with a fastener.

24. The method of claim 19 wherein said step of supporting said elongated object from a single shaft that is connected to said joist connector further comprises:

securing a portion of said shaft to said elongated object by penetrating said elongated object with a distal portion of said shaft.

25. The method of claim 19 wherein said step of supporting said elongated object from a single shaft that is connected to said joist connector further comprises:

wrapping a proximal portion of said shaft aronnd at least a portion of said elongated object;

securing a distal portion of said shaft to said joist connector.

26. The method of claim 19 wherein said step of supporting said elongated object from a single shaft that is connected to said joist connector further comprises:

wrapping a proximal portion of said shaft around at least a portion of said elongated object; and, securing a distal portion of said shaft to said proximal portion of said shaft.

* * * * *